Patented Nov. 14, 1950

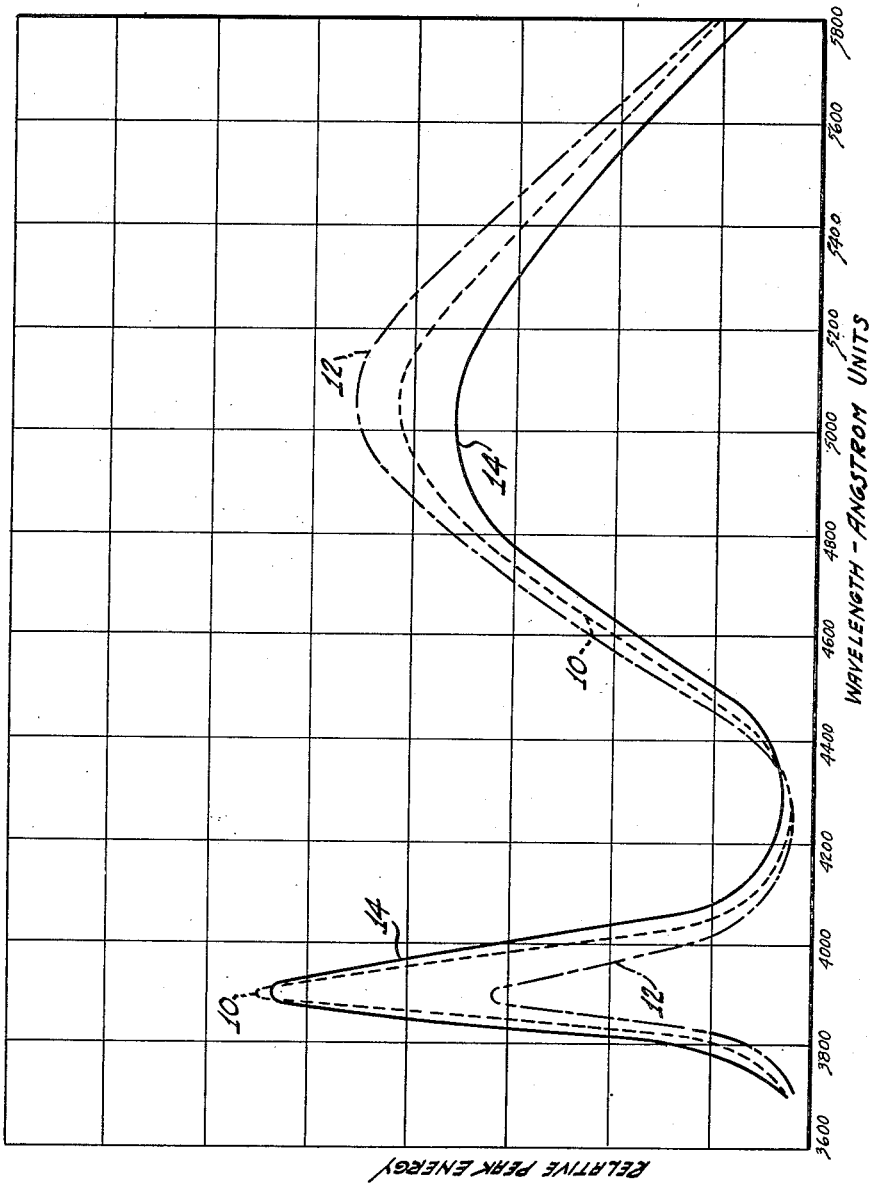

2,529,711

UNITED STATES PATENT OFFICE 2,529,711

METHOD OF MAKING A ZINC OXIDE PHOSPHOR

Arthur L. J. Smith, Lancaster, Pa., assignor to Radio Corporation of America, a corporation of Delaware Application May 27, 1948, Serial No. 29,577

14 Claims. (Cl. 252—301.6)

This invention relates to materials that fluoresce upon excitation by cathode rays, light and ultra-violet waves, X-ray, and other forms of energy.

In some applications of a fluorescent phosphor screen, it is greatly desirable to utilize the ultra-violet emission instead of the visual emission of the phosphor. For example, in a "flying spot" scanning kinescope using a zinc oxide phosphor screen, it has been recognized that the ultra-violet output of the phosphor has a shorter decay time than the visible component. For such applications, it is therefore desirable to use a zinc oxide phosphor having a high efficiency in ultra-violet regions of the spectrum.

An object of my invention is to provide an improved crystalline inorganic phosphor having high efficiency of luminescence in the ultra-violet regions of the spectrum.

A further object of the invention is to provide an improved crystalline inorganic phosphor having very short persistence of decay.

Another object is to prepare a more efficient zinc oxide phosphor, particularly for comparatively low voltage and high current density cathode ray excitation.

A further object of my invention is to provide an easily controllable method of preparing a zinc oxide phosphor.

Another object of my invention is to provide a method of preparing zinc oxide phosphor whose characteristics are determined by controllable steps in the method.

Other objects will appear in the following description, reference being had to the drawing, which is a graphical representation of the emission characteristics of three zinc oxide phosphors prepared according to my invention.

I have found that luminescent zinc oxide phosphor having good characteristics can be prepared by, firing the zinc oxide in a reducing atmosphere of hydrogen, ammonia, or carbon monoxide or other reducing medium until an excess of zinc has been formed; removing the excess zinc by oxidation or volatilization; and then, permitting the residual zinc to diffuse throughout the individual crystals.

More specifically for the preparation of the phosphor, I use a chemically pure zinc oxide material which has been prepared by a dry process. Between 50 to 75 grams of the zinc oxide material are placed in a porcelain or quartz boat and inserted into a quartz tube. A stream of CO or $H_2$ is passed through the cold tube for approximately 10 minutes before the tube is placed into a furnace and fired between 940° C. and 1000° C. for 60 minutes in a reducing carbon monoxide atmosphere. This firing step is followed by a second firing of the material in a nitrogen atmosphere containing from 0.01% to 0.3% of oxygen for five to twenty minutes at 940° to 1000° C. The phosphor material is then cooled in this mildly oxidizing atmosphere.

The above-described procedure of producing zinc oxide phosphor is one which produces consistently good phosphor material having high efficiency in the ultra-violet. The process is also one which can be easily controlled. The time of the first firing in CO is not critical. Good phosphor material may be produced for shorter and longer periods of time than the sixty minutes. However, the sixty minute firing in CO results in the most efficient material. A less efficient phosphor material is obtained when the material is fired in CO for more than or less than the sixty minute optimum firing time.

The optimum firing time of sixty minutes reduces the zinc oxide to produce the desired amount of zinc metal. Firing for a longer time tends to use up the base material. The temperature range of this CO firing is such that below 940° C. the reaction is too slow and also the desired reaction will not take place below the boiling point of zinc at 907° C. Above 1000° C., the firing in CO produces a too rapid growth of crystalline ZnO phosphor which is undesirable. The second firing in the nitrogen atmosphere containing a trace of oxygen provides a controlled reoxidation of the zinc produced in the first firing step. When the zinc oxide is fired, as described above, for ten minutes in the mixed atmosphere of nitrogen and oxygen, the resulting phosphor will have higher efficiency in the ultra-violet and lower efficiency in the visual region of the spectrum than if the firing in the mixed atmosphere were continued for twenty minutes. This fact is graphically shown in the figure in which curve 10 represents the emission characteristics of a zinc oxide phosphor, produced by the method described, in which the second firing was continued for ten minutes in the mixed atmosphere. Curve 12 represents the emission characteristics of a zinc oxide phosphor produced by the same process but in which the mixed atmosphere firing was for twenty minutes. If the second firing is less than ten minutes or greater than twenty minutes a less efficient phosphor is obtained. Also, the temperature of the second firing will determine the optimum firing time, since firing at a higher temperature requires a shorter optimum firing time and likewise a lower firing temperature requires a longer optimum firing time. A trace of oxygen in the cooling atmosphere tends to reduce the ultra-violet efficiency, but increases the efficiency of the visual emission.

The reactions taking place, during the preparation of the zinc oxide phosphor described above, are undoubtedly, first, a reduction of some of the zinc oxide to form free zinc metal within the batch, and secondly, a diffusion, volatilization, or reoxidation of the excess metal. It is not clear just what the function of this zinc metal is, yet it is thought to be an activator. Zinc oxide phosphor has only been produced successfully by firing the material in the presence of zinc metal. By firing the zinc oxide material 60 minutes with a reducing CO atmosphere, zinc metal is formed in an amount in excess of that necessary to produce a good phosphor. The excess amount of free zinc metal, produced in the reduction step, determines the time required to drive off or oxidize this excess metal in the second stage of firing. It might be possible to determine the actual time required for the reduction firing of zinc oxide for any particular sized batch in order to produce the exact amount of zinc metal required for activation, however, the control of the firing time and firing atmosphere would be so extremely critical, that the process would be unmanageable from the standpoint of reproducibility. It is desirable that the particle size of the zinc oxide material used be as small as possible to prevent the forming of a grainy screen, as during the firing of the zinc oxide material, the particle size of the crystals tend to grow. This may be partially controlled by not using higher firing temperatures than those given above. No attempt is made to mechanically reduce the particle size of the phosphor formed, as such a step lessens its efficiency.

Luminescent zinc oxide having good emission in the visual region of the spectrum has been prepared in the past by firing the zinc oxide material in hydrogen followed by cooling in air. In this process, zinc metal is produced in the reduction firing step and any excess zinc metal is eliminated by reoxidation during the cooling in air. This process is difficult to control, as the firing time must remain short and hence is extremely critical. The cooling condition is also extremely difficult to control to produce a useful phosphor. The air, present during cooling, tends to reoxidize the zinc metal so rapidly that control of the process is lost. Methods of producing zinc oxide phosphors, where there is an uncontrolled reoxidation of zinc metal within the mixture, will not produce a phosphor having consistently good ultra-violet output.

A more controllable method of preparing zinc oxide phosphor, by firing in hydrogen, is to fire the zinc oxide material between five and twenty minutes at from 940° to 1000° C. in a reducing atmosphere of hydrogen, followed by the controlled oxidation step of firing in nitrogen plus traces of oxygen, (0.01% to 0.3%) from 10 to 60 minutes, at 940° C. to 1000° C. Alternatively, this firing step may take place in an atmosphere of an inert gas containing no oxygen. The phosphor material is then cooled in the mixed nitrogen-oxygen atmosphere or in the inert atmosphere containing no oxygen. Although the preparation of zinc oxide phosphor by a hydrogen reduction firing is normally hard to control, the method given here is not as critical, when the hydrogen firing is followed by the firing in a controlled oxidizing medium. Cooling of the zinc oxide phosphor in air after a reduction firing, as previously practiced by others, is difficult to control due to the too rapid reoxidation of the zinc metal.

In the controlled oxidation firing of zinc oxide material in mixed nitrogen and oxygen, a greater proportion of oxygen will speed the reaction while a smaller proportion of oxygen will slow down the reaction. Also, the mixed nitrogen-oxygen firing may be followed by a third firing of the phosphor material at 940° C. to 1000° C. in pure nitrogen to increase the ultra-violet emission at the expense of the visual emission. I have found, that after the first reduction firing of the zinc oxide material, by appropriately varying the times of firing in the mixed atmosphere of nitrogen and oxygen and of firing in pure nitrogen, I can produce a zinc oxide phosphor having a desired ratio of ultra-violet emission to visual emission.

Another zinc oxide phosphor having high ultra-violet emission may be produced by a first reduction firing of zinc oxide material in pure carbon monoxide for 10 to 60 minutes at a temperature between 940° C. to 1000° C., or in hydrogen for 10 to 15 minutes at 970° C. to 1000° C. This is then followed by a second neutral firing of the material in a pure nitrogen atmosphere for 10 to 60 minutes at 970° C to 1000° C. Alternatively, the range of firing temperature for this step may be 940° C. to 1000° C. The phosphor is then cooled in the pure nitrogen atmosphere. The time of the reduction firing is not critical and efficient phosphor material can be produced by shorter firing times. Again, the first firing determines the time required for the second firing. In this method it is presumed that the excess zinc is removed by volatilization. The second neutral firing step may be omitted if the phosphor material is cooled in a pure CO or pure $N_2$ atmosphere immediately after the first firing in CO. However, the use of the second firing in $N_2$ will produce more consistently phosphors of high efficiencies in the ultra-violet than those which use only a cooling step in CO or $N_2$ after the first reduction firing step because, as mentioned previously, the amount of zinc cannot be controlled adequately by only a reduction firing. In the figure, curve 14 represents the emission characteristics of a zinc oxide phosphor produced by the method including the second step of firing in pure nitrogen. It can be seen that the phosphor represented by curve 14 has essentially the same efficiency in the ultra-violet as curve 10 but a lower visual efficiency.

While I have indicated and described several systems for carrying my invention into effect, it will be apparent to one skilled in the art that my invention is by no means limited to the particular organizations shown and described, but that many modifications may be made without departing from the scope of my invention.

What I claim as new is:

1. The method of making a zinc oxide phosphor comprising the steps of, firing zinc oxide material between 940° C. and 1000° C. in a reducing atmosphere between 10 to 60 minutes, and firing the above fired material between 940° C. and 1000° C. in a nitrogen atmosphere containing the equivalent of from 0% to 0.3% of oxygen.

2. The method of making a zinc oxide phosphor comprising the steps of, firing zinc oxide material between 940° C. and 1000° C. in a reducing atmosphere between 10 to 60 minutes, firing the above fired material between 940° C. and 1000° C. in a nitrogen atmosphere containing the equivalent of from 0% to 0.3% of oxygen, and cooling the twice fired phosphor in a nitrogen atmosphere containing the equivalent of from 0% to 0.3% of oxygen.

3. The method of making zinc oxide phosphor comprising the steps of, firing zinc oxide at 940° C. to 1000° C. in a reducing atmosphere, firing the fired zinc oxide between 940° C. and 1000° C. in an atmosphere of nitrogen containing 0.01% to 0.3% of oxygen, cooling the fired zinc oxide in the atmosphere of nitrogen containing 0.01% to 0.3% of oxygen.

4. The method of making zinc oxide phosphor comprising the steps of, firing zinc oxide between 940° C. and 1000° C. in a reducing atmosphere of carbon monoxide for at least 10 minutes, firing the fired zinc oxide in an atmosphere of nitrogen containing 0.01% to 0.3% of oxygen at 940° C. to 1000° C. for five to twenty minutes, and cooling in an atmosphere of nitrogen containing 0.01% to 0.3% of oxygen.

5. The method of making zinc oxide phosphor comprising the steps of, firing zinc oxide between 940° C. and 1000° C. in a reducing atmosphere of carbon monoxide for at least ten minutes, firing the fired zinc oxide in an atmosphere of nitrogen containing 0.01% to 0.3% of oxygen at a temperature of 940° C. to 1000° C. for five to ten minutes, and cooling the twice fired zinc oxide in an atmosphere of nitrogen containing 0.01% to 0.3% of oxygen.

6. The method of making zinc oxide phosphor comprising the steps of, firing zinc oxide in a reducing atmosphere of hydrogen at 940° C. to 1000° C. for at least five minutes, firing the fired zinc oxide in an atmosphere of nitrogen containing 0.01% to 0.3% of oxygen at a temperature of 940° C. to 1000° C. for at least ten minutes, and cooling the twice fired zinc oxide in an atmosphere of nitrogen containing 0.01% to 0.3% of oxygen.

7. The method of making a zinc oxide phosphor comprising the steps of, firing zinc oxide material in a reducing atmosphere, at a temperature of at least 907° C. firing the above-fired material in an inert atmosphere at a temperature of at least 907° C., and cooling the fired material in an inert atmosphere.

8. The method of making a zinc oxide phosphor comprising the steps of, firing zinc oxide in a reducing atmosphere between 940° C. and 1000° C. for at least 10 to 60 minutes, firing the above-said fired zinc oxide in an inert atmosphere between 940° C. and 1000° C. for at least 10 to 60 minutes, cooling the fired material in an inert atmosphere.

9. The method of making a zinc oxide phosphor comprising the steps of, firing zinc oxide in a reducing atmosphere between 940° C. and 1000° C. firing said fired zinc oxide in an inert atmosphere of pure nitrogen between 940° C. and 1000° C. and cooling the fired material in an inert atmosphere.

10. The method of making zinc oxide phosphor comprising the steps of, firing zinc oxide in a reducing atmosphere of carbon monoxide between 940° C. and 1000° C. for at least 10 to 60 minutes, firing the fired zinc oxide in a neutral atmosphere of pure nitrogen at 940° C. to 1000° C. for at least 10 to 60 minutes, and cooling the fired material in a neutral atmosphere of pure nitrogen.

11. The method of making zinc oxide phosphor comprising the steps of, firing zinc oxide in a reducing atmosphere of hydrogen at 940° C. to 1000° C. firing the fired zinc oxide in an atmosphere of pure nitrogen at 940° C. to 1000° C., cooling the said fired material in an atmosphere of pure nitrogen.

12. The method of making a zinc oxide phosphor comprising the steps of, firing zinc oxide material at a temperature of at least 907° C. in a reducing atmosphere, firing the above fired material at a temperature of at least 907° C. in an atmosphere consisting essentially of a neutral gas and containing the equivalent of from 0% to 0.3% of oxygen, and cooling the twice fired phosphor in an atmosphere consisting essentially of a neutral gas and containing the equivalent of from 0% to 0.3% of oxygen.

13. The method of making a zinc oxide phosphor comprising the steps of, firing zinc oxide material between 940° C. and 1000° C. in a reducing atmosphere, firing the above fired material at a temperature of 940° C. to 1000° C. in a substantially neutral atmosphere selected from the group consisting of an inert atmosphere and an atmosphere consisting essentially of an inert gas containing the equivalent of from 0% to 0.3% oxygen, and cooling the twice fired phosphor in a substantially neutral atmosphere selected from the group consisting of an inert atmosphere and an atmosphere consisting essentially of an inert gas containing the equivalent of from 0% to 0.3% oxygen.

14. The method of making zinc oxide phosphor comprising the steps of, firing zinc oxide at a temperature of at least 907° C. in a reducing atmosphere, firing the fired zinc oxide at a temperature of at least 907° C. in a substantially neutral atmosphere selected from the group consisting of an inert atmosphere and an atmosphere consisting essentially of an inert gas containing the equivalent of from 0% to 0.3% of oxygen, and cooling the twice fired material also in an atmosphere selected from said group.

ARTHUR L. J. SMITH.

REFERENCES CITED

The following references are of record in the file of this patent:

UNITED STATES PATENTS

| Number | Name | Date |
|---|---|---|
| 1,355,904 | McKee | Oct. 19, 1920 |
| 1,422,485 | Lewis | Jan. 16, 1923 |
| 1,838,359 | Brinker | Dec. 29, 1931 |
| 2,408,475 | Nickle | Oct. 1, 1946 |